United States Patent [19]

Celette

[11] Patent Number: 5,140,533
[45] Date of Patent: Aug. 18, 1992

[54] DEVICE FOR CHECKING THE POSITION OF VARIOUS POINTS OF A VEHICLE

[75] Inventor: Germain Celette, Vienne, France
[73] Assignee: Celette S.A., France
[21] Appl. No.: 497,235
[22] Filed: Mar. 22, 1990

[30] Foreign Application Priority Data

Mar. 24, 1989 [FR] France ............................ 89 04210

[51] Int. Cl.⁵ .............................................. G01B 11/14
[52] U.S. Cl. ...................................... 364/559; 356/376
[58] Field of Search ................. 364/449, 456, 424.01, 364/559; 356/376

[56] References Cited

U.S. PATENT DOCUMENTS

| | | | |
|---|---|---|---|
| 4,488,233 | 12/1984 | Tsumura | 364/456 |
| 4,729,660 | 3/1988 | Tsumura et al. | 356/375 |
| 4,820,041 | 4/1989 | Davidson et al. | 364/456 |
| 4,829,442 | 5/1989 | Kadonoff et al. | 364/449 |

*Primary Examiner*—Thomas G. Black
*Attorney, Agent, or Firm*—Wall and Roehrig

[57] ABSTRACT

This device employs a telemeter (2) which serves to measure its distance from each point to be measured, pivoting mount (9,10) for orientation of the telemeter about two perpendicular axes of rotation, two stepping and reducing motor assemblies assuring the two movements of rotation, and a computer equipped with a microprocessor intended to acquire each distance measurement measured by the telemeter, to control the movement of the stepping motors by storing in memory the number of steps made during the rotation, around each axis, and to calculate, from the distance between the telemeter and each point, and from the angles of rotation of the beam between the various points measured, the distance between at least two points.

9 Claims, 3 Drawing Sheets

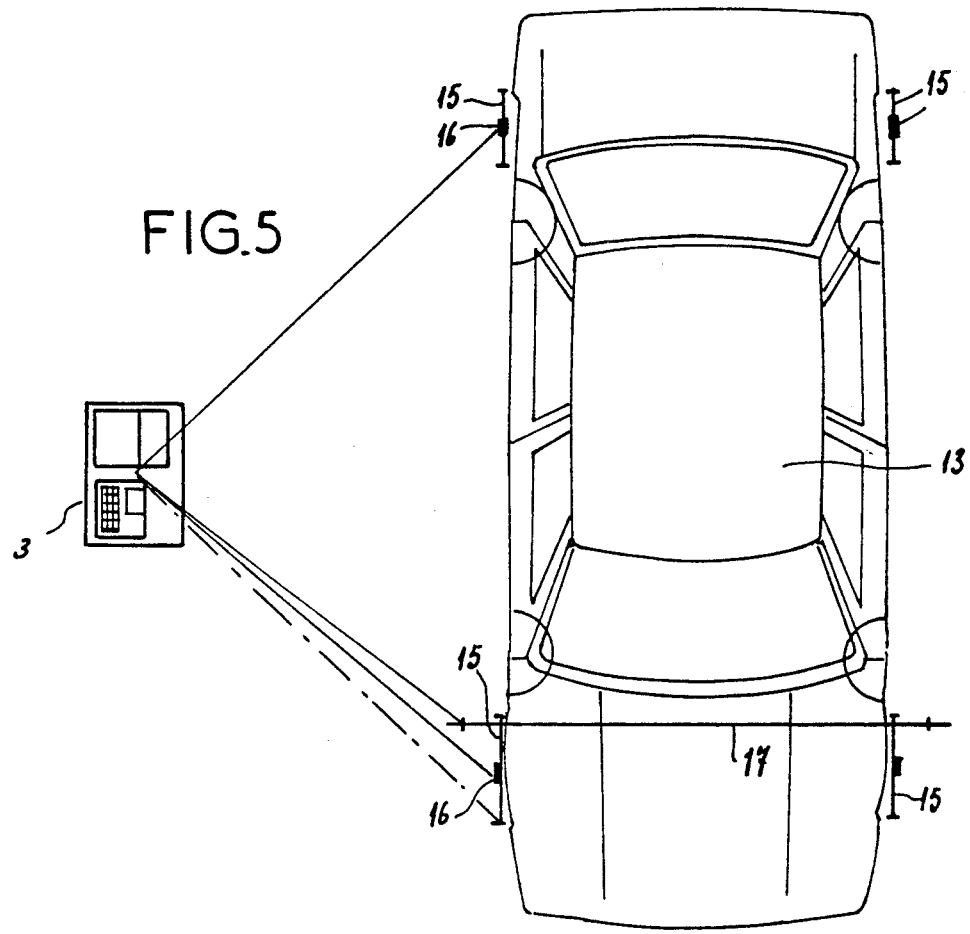
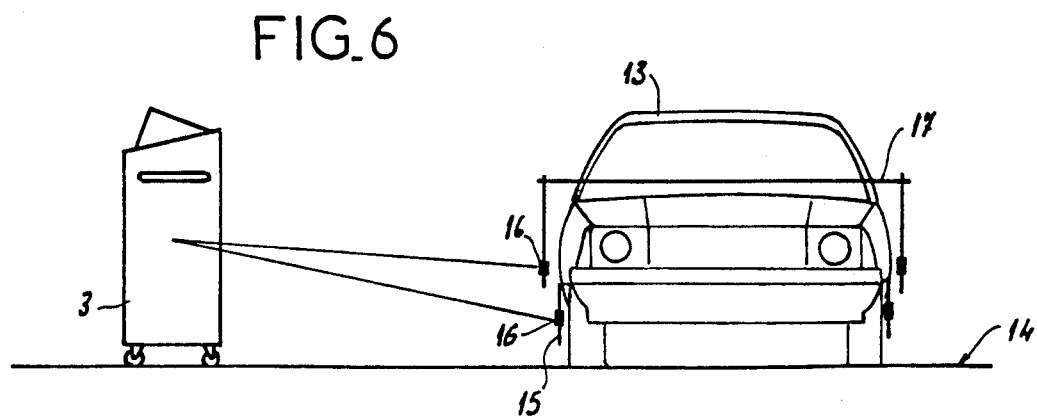

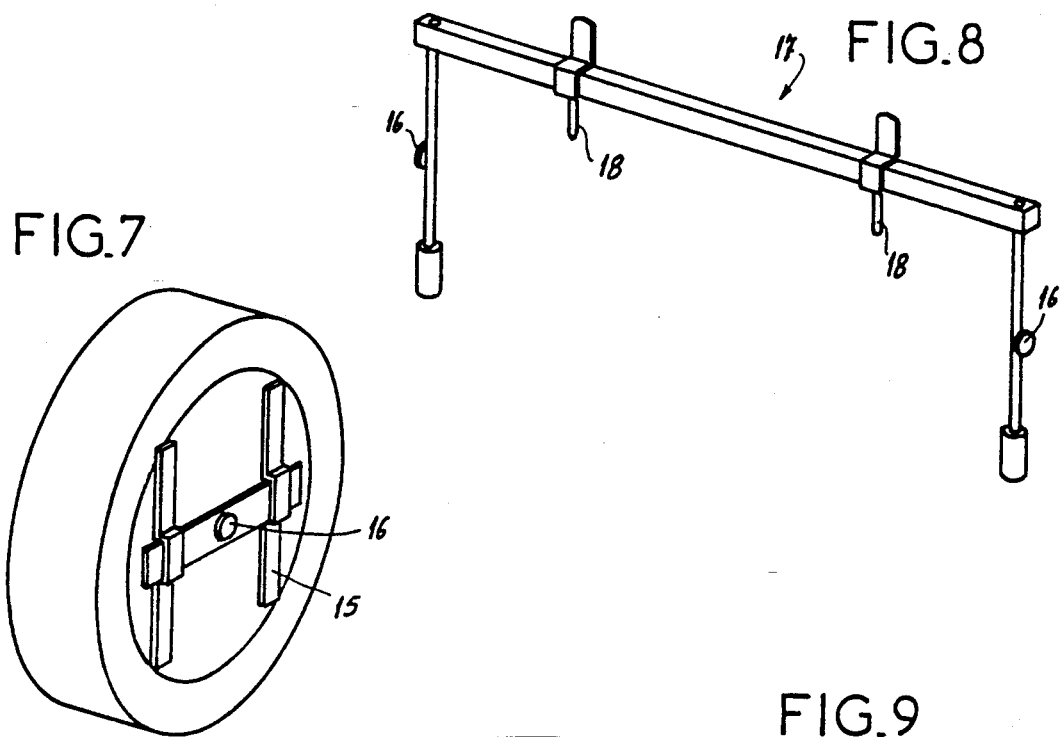
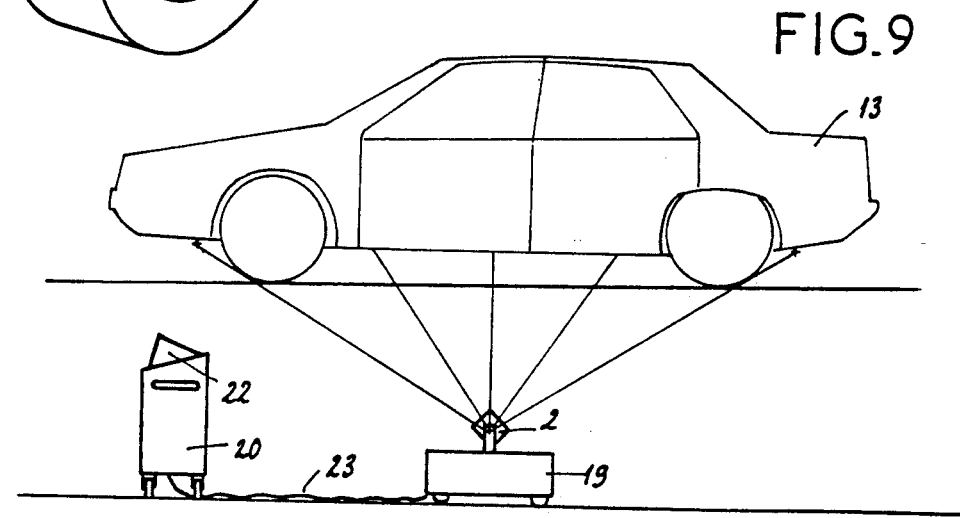
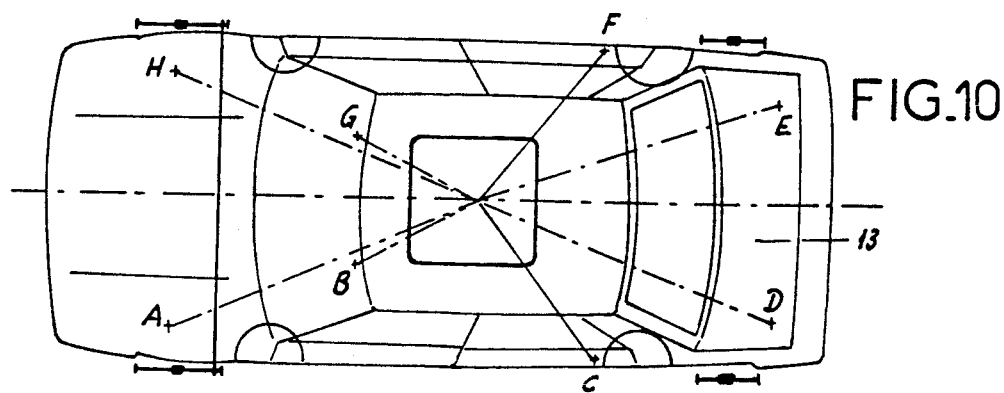

DEVICE FOR CHECKING THE POSITION OF VARIOUS POINTS OF A VEHICLE

The present invention relates to a device for checking the position of various points of a vehicle, the term vehicle being taken in a broad sense and covering both automotive vehicles and other types of vehicles such as aircraft or parts thereof.

In order to ensure the safety of road users, it would be advantageous to make systematic tests of the vehicles, by checking the symmetry of the vehicle with respect to its longitudinal axis as well as the proper position of a certain number of characteristic points.

It is nowadays only after a vehicle has been in a serious accident that an exact check thereof is made, by "putting it through on the surface plate."

When an automotive vehicle has been in an accident, it is desirable to make a controlled alignment of the deformed parts, so that they will be brought back to their original position. To this effect, one uses a surface plate comprising a rectangular chassis of metal on which the vehicle is mounted by means of four jaws which clamp the underbody, the longitudinal, lateral and vertical dimensions of the four jaws being a function of the type of vehicle to be repaired. The vehicle having been correctly positioned and fixed on the surface plate, a measuring frame with longitudinal graduations is positioned on the surface plate and under the vehicle. After the frame has been positioned relative to the vehicle with respect to three adjustment points serving as reference, taken in an undeformed part of the vehicle, the chassis is blocked on the surface plate. On the measuring frame, graduated rulers are intended to be fixed transversely, on which can slide vertically adjustable cursors carrying measuring fingers or posts ("towers") whose position in height is marked by a graduated index.

For each type of vehicle the repairman has available three dimensions of a certain number of characteristic points, as well as accessory ones intended for measuring each point. The various values are read, respecitvely, in the longitudinal rulers, on the transverse rulers, and on the posts. This solution is not entirely satisfactory, for a number of reasons. First of all, it necessitates purely manual measuring, sometimes done in zones difficult to reach, which may cause errors. Besides, in view of the deformations of the vehicle and the presence of the means for securing, aligning and checking it, it is not possible to get to all points of the body and of the chassis. Lastly, it is necessary to calculate, from the reference coordinates, the coordinates of the points identified on the technical data sheet, which is lengthy and fastidious and may be a source of error. Also, the operator must compare the values of the measurement performed to the values of the measured point appearing on the reference sheet.

It is the object of the invention to provide a device for checking the position of several points of a vehicle which does not require mounting the vehicle on a measuring chassis, or contact between the measuring tools and the vehicle, while permitting to obtain qualitative and quantitative information by determining, on the one hand, if the vehicle is deformed and what part of it is deformed, and on the other hand, what the value of the displacement of the measured points is relative to the maker's reference.

To this effect, the device is question comprises:

a telemeter for measuring its distance from each point to be measured, means for orienting the telemeter about two perpendicular axes of rotation, two stepping and reducing motor assemblies ensuring the two rotational movements, and a computer equipped with a microprocessor intended to:

acquire each distance measurement measured by the telemeter, control the movement of the stepping motors by storing in memory the number of steps carried out during the rotation about each axis, calculate, from the distance between the telemeter and each point, and from the angles of rotation of the beam between the various points measured, the distance between at least two points, or the coordinates of at least one point relative to a previously measured point.

According to one form of execution, this device comprises a laser telemeter, and the points whose distance from the telemeter is to be measured are equipped with targets reflecting the light of the laser beam in its direction of emission.

Advantageously, the computer is equipped with means for storing in memory theoretical values of the coordinates of a certain number of points or of the distances between certain points of the vehicle, and with means for comparing the measured values with these theoretical values, or measured values with one another.

It is thus possible to carry out various types of vehicle testing, without contact with the vehicle, such as: measurement of lateral distances (centerline distances of wheels, door hinges, angles of window panes, ends of drip moldings); measurement of points situated under the chassis of th vehicle; measurement of parallelism of wheels, of camber angles, of caster angles and striking angles of the steerable wheels.

According to a characteristic of the invention, this device comprises a reflecting target intended to be secured at each point of the vehicle belonging to a series of measurements. This target, which favors the reflection of the laser beam and permits proper positioning thereof, can be secured by magnetic means, by temporary gluing, or by wedging, depending on the configuration of the environment of the measurement point.

In addition, and to permit automatic centering of the laser beam on each target, the telemeter is designed also to measure the light intensity of the laser beam received, the computer being arranged to act on the stepping motors for positioning the laser beam, for displacing it relative to a target, until the maximum light intensity is received.

Prior to measuring a point, it suffices, therefore, for the operator to summarily aim at this point with the aid of the laser beam, an then to control the automatic sequence of aiming at the point to be measured.

According to a first form of execution of this device, the telemeter is mounted on a support articulated on two perpendicular axes of rotation, the point of intersection of these two axes coinciding with the point of origin of the measurements of the telemeter.

According to a second form of execution of this device, the telemeter is mounted on a fixed support and the laser beam is pointed onto a mirror articulated about two perpendicular axes, the point of intersection of which coincides with the point of impingment of the laser beam on the mirror.

As the mirror is easier to displace than the telemeter, this second form of execution permits the use of less powerful motors, a lighter articulation system, and to simplify the adjustment of the coincidence of the point of impingment of the laser beam with intersection of the two axes of rotation.

According to another characteristic of the invention, an electronic device permits, on demand of the computer, to reflect onto the receiver a portion of the beam from the transmitter along a known path, thus giving a possibility of calibration. This permits making oneself independent of the possible variations in time of such parameters as temperature or atmospheric pressure.

Preferably this device comprises a carriage on which the telemeter is mounted. For performing measurements under the vehicle, the carriage should advantageously be as low as possible, in order not to have to raise the vehicle too high. In this case, the control console is not mounted on the carriage. Conversely, in the case of a device intended to perform lateral measurements, the control console, screen and keyboard can be mounted on the carriage. The computer and the printer, for printout of the measurement results, are set up in a fixed location.

Another possibility, in the case of lateral measurements, is to arrange a tunnel in which two telemeters, controlled by the same computer, are mounted on fixed supports.

In any event, the invention will be well understood by means of the description which follows, with reference to the annexed schematic drawing, showing, by way of non-limiting examples, several forms of execution of this device:

FIGS. 5 and 6 are two views, respectively, from above and from the front, during lateral checking of a vehicle;

FIG. 7 is a view of a device intended to assure aiming at the center of a wheel;

FIG. 8 is a view of a tool permitting to assure the aiming, with the aid of a measuring device, by taking into account the points of attachment of the MAC PHERSON shock absorbers;

FIGS. 9 and 10 are two views of a vehicle from the side and from above respectively, showing the possibilities of checking it from below.

Figure 1:
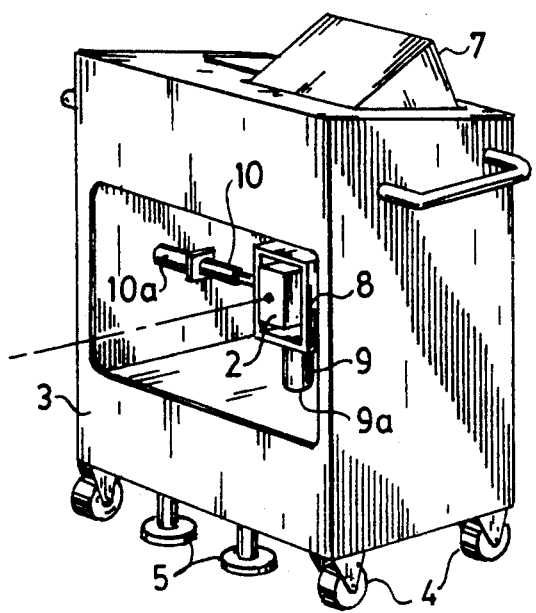
FIGS. 1 and 2 are two perspective three-quarter front and three-quarter back views of a measuring and control device mounted on a carriage.
Figure 2:
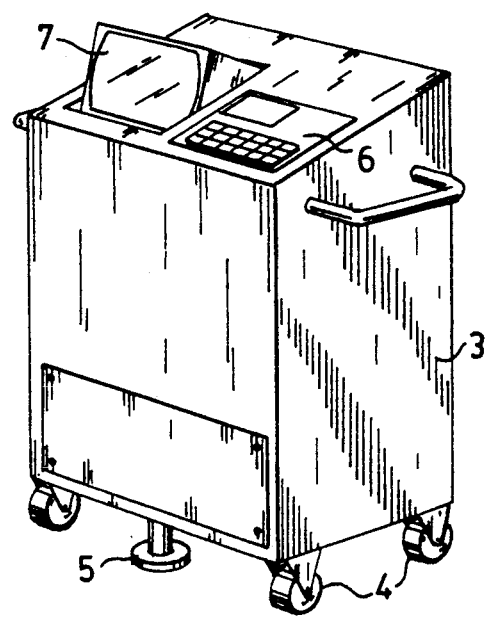

The device according to the invention comprises essentially a laser telemeter which, in the form of execution represented in FIGS. 1 and 2, is mounted inside a chassis belonging to a carriage equipped with wheels 4 and three telescoping legs 5 intended to assure the stability of the carriage during measurement.

In the top face of the carriage are mounted a control console 6 and a monitor 7. The telemeter 2 is intended to measure its distance from a point to be measured.

This distance measurement is carried out by measuring the propagation time of the beam, this measurement being then reduced to a phase shift measurement. If D is the distance to be measured and C is the speed of light, the propagation time t is equal to:

$$t = 2D/C.$$

A resolution of 0.1 mm implies a resolution in time of the order of 0.6 ps. In view of the smallness of this value, it was decided to resort to a phase shift measurement on a high-frequency carrier wave. To this effect, the beam of the laser diode forming the transmitter is high-frequency modulated, diffused by the target, modulated at the same frequency, picked up by the photoreceiver, and amplified.

The propagation time then appears in the form of a phase shift of two high-frequency signals, the phase measurement being performed at low frequency, by bringing about a change of frequencies on the two high-frequency signals, which does not modify the phase shift.

Thus the distance sought is directly proportional to the measured phase.

Furthermore, an electronic device integrated in the measuring head permits returning to the receiver, on demand of the control means, a portion of the beam from the transmitter over a known path, thus providing a possibility of simple calibration whereby one can become independent of any variations in time of such parameters as temperature or atmospheric pressure.

This apparatus supplies two measurements upon demand:

a measurement of the distance separating the receiving diode from the target aimed at with a precision of the order of 0.2 mm for distances varying between about 0 and 5 m;

a measurement of light intensity of the laser beam received by the apparatus. This measurement is utilized for carrying out the automatic centering of the beam on the target. To permit this centering, the targets are shaped for increasing the reflection of the laser beam in the direction of the telemeter. The surface of each target is reflecting, made up for example by glass balls of small diameter and a black ring is imprinted in the center of the target, so as to permit benefiting from a reflection of maximum intensity at this level.

In order to sweep a very wide space with the laser beam, the telemeter is mounted on a support 8 articulated on two perpendicular axes of rotation 9 and 10. For the point of origin of the measurements to remain fixed when the telemeter is driven in rotation about the two axes, the point of intersection of these two axes coincides with the point of origin of the measurements of the telemeters.

Figure 3:
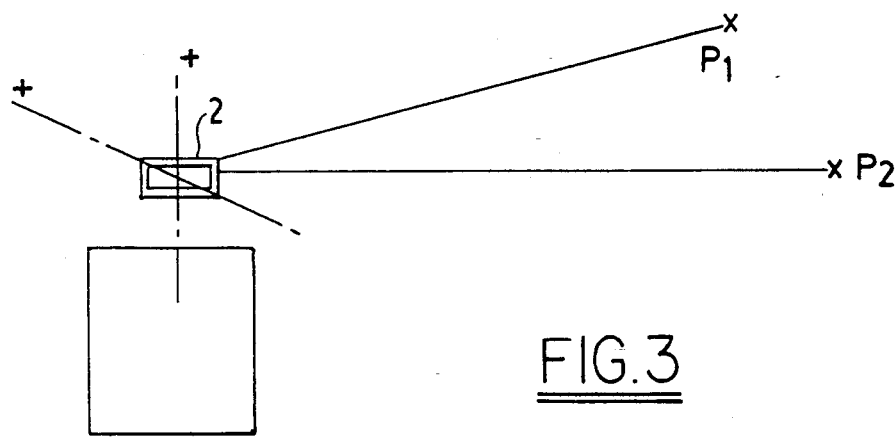
FIGS. 3 and 4 are two schematic views showing two possibilities of orientation of the laser beam.

Such an arrangement is represented in FIG. 3.

Figure 4:
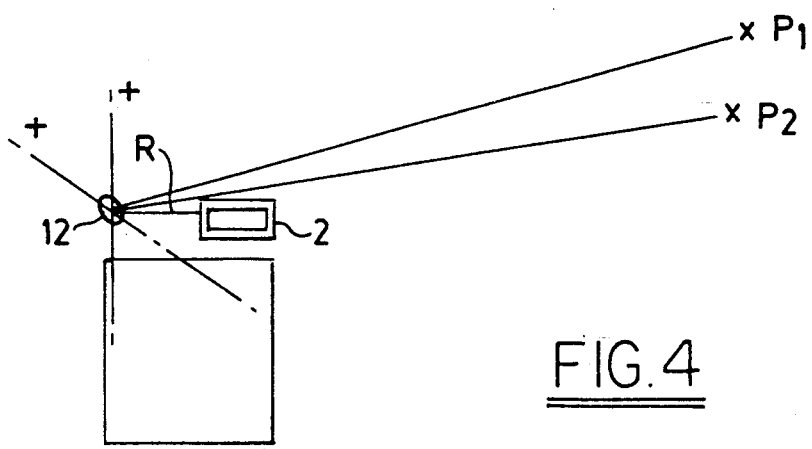

Another possibility for obtaining the movement of the laser beam is shown schematically in FIG. 4. In this case, the telemeter 2 is fixed and the laser beam R is pointed to a mirror 12 which is articulated on two perpendicular axes whose intersection coincides with the point of impingment of the beam on the mirror.

Whichever solution is envisaged, the rotation is ensured by two stepping and reducing motor assemblies 9a, 10a mounted at the ends of the axes 9, 10, in order to control their respective angular displacements with an excellent precision (+0.001° of angle), between the sighting of a point P1 and that of a point P2.

This device also comprises a computer equipped with a microprocessor. This computer aims to:

control the fine adjustment of the telemeter and to acquire the measurements thereof;

control the stepping motors and the storing in memory of the number of steps carried out for each axis;

calculate the distances between the various measured points;

compare these distances with one another or with theoretical values;

calculate the coordinates of at least one point relative to an initial measurement point;

store in memory theoretical values by model and by year of the vehicle (these are furnished by the manufacturer);

generate the display of the results obtained with data and hour;

generate the print-out of the results obtained with date and hour on a printer.

FIGS. 5 and 6 show how to make lateral measurements on a vehicle 13. The vehicle is shown on its wheels, on an approximately plane surface 14. The operator positions the carriage 3 containing the measuring and control apparatus on one of the two sides of the vehicle at a distance therefrom sufficient for the beam to be displaced successively toward the various points to be measured.

If it is desired to measure the distance between the two front and rear wheels, one places on the rims of the vehicle a piece 15 whose portion situated at the axle has a target 16 which reflects the light of the laser beam in the direction from which it came. The operator brings the laser beam onto the first target. He then pushes a function key of the console to trigger the automatic search of the center of the target, so as to bring about the automatic positioning of the beam on this center.

After validation of the measurement, the operator orients the beam to aim at the other target. After validation, and insofar as only the distance between the axles of two wheels is to be measured, the operator controls the calculation of this length, which is obtained by taking into account the distance between the telemeter and each target, and the angles by which the telemeter has been pivoted to get from one target to the other.

In the course of the same operation, it is possible to aim at a target 16 mounted on a tool 17 in the form of a gantry having support devices 18 which take support on the points of attachment of the MAC PHERSON struts or shock absorbers.

When the measurements have been made on one side of the vehicle, the carriage is brought to the other side thereof in order to perform the corresponding measurements, which are then compared by the computer.

In the case of a testing tunnel, two telemeters may be provided on either side of the tunnel, between which the vehicle passes. The operator need to longer handle carriages, and the two telemeters, controlled by the same computer, furnish an immediate result.

The same procedure can be used to check the body itself of a vehicle. It suffices then to point the laser beam at precise characteristic points of the body, such as door hinges, ends of drip moldings, windshield or window pane angles, etc.

It is possible to compare the calculated distances between one side of the vehicle and the other, or to compare these distances with theoretical reference values.

The device according to the invention also permits in-depth lateral measurements, with the vehicle no longer resting on its wheels, the wheels being taken off, the wheel tools 15 being now arranged on the hub or brake disk rather than on the wheel.

It is also possible to make measurements of wheel parallelism, of camber angle, of caster angle or angle of striking of the steerable wheels, whether or not they are driving wheels.

To this effect, it is desirable to have available a target-holding tool, with a target in the center of the tool and several targets, for example four, arranged in a circle centered on the axle of the wheel. The measuring procedure is identical with that indicated before, but it permits in addition, by involving the rotation of the hub, to check out-of-round or buckling of wheels, to compare angles and lengths between front and rear axles, and to check the angles when the steerable wheels strike.

FIGS. 9 and 10 illustrate a method of checking the vehicle from below.

To this end, the vehicle 13 is placed on a hoist not shown in the drawing, and a carriage 19 carrying the single telemeter 2 is slid under the vehicle substantially at the center thereof. A carriage 20 with the control console 22 is connected by a cable 23 to the carriage 19. It is possible to make sightings on a certain number of significant points of the chassis of the vehicle, of which there are eight in the form of execution represented in the drawing and which are referenced from A to H.

Starting with a point which belongs to an undeformed zone of the vehicle, the operator successively makes measurements at other points, the computer having in memory the theoretical coordinates of the various points as well as the distances between these various points, thereby supplying any deviation between the measured position and the theoretical position.

If, for an unusual type of vehicle, the operator does not have measurement data sheets, he can nevertheless make a very exact check of the symmetry of the vehicle by comparing the respective lengths between several points situated on one side of the vehicle and on the other side of the vehicle, and also by calculating, with respect to the axis of symmetry of the vehicle, the crossing point between the corresponding lines intersecting this axis of symmetry.

All these types of measurements and the utilization of their results are functions of the data processing programs of the computer.

As is evident from the foregoing, the invention contributes a great improvement to the existing art, by supplying a device for checking the position of characteristic points of a vehicle, permitting to verify, without contact with the vehicle and without any special intervention thereon, the conformity of its dimensions relative to the theoretical dimensions.

Furthermore, this device can also be used for vehicle repair, as it enables the operator to determine which are the deformed zones of the vehicle and what the value of the deformation is, and this enables him to determine how to intervene on the vehicle to restore its conformity to the original dimensions.

It should be noted that it would be possible to envisage measuring methods other than with laser telemeter, without going outside the scope of the invention.

I claim:

1. Device for checking the position of various points of a vehicle, which comprises:
   a telemeter for measuring its distance from each point to be measured, on the basis of propagation time of a light beam emitted by the telemeter and reflected to it from said point,
   means for permitting orienting the telemeter about two perpendicular axes of rotation, two stepping and reducing motor assemblies for rotating the telemeter step by step about said two axes, and a computer coupled to said telemeter and to said stepping and reducing motor assemblies and suitably programmed to:

acquire each distance measurement measured by the telemeter, control the movement of the stepping and reducing motor assemblies by storing in memory the number of steps carried out during the rotation about each axis, calculate, from the distance between the telemeter and each point, and from the angles of rotation of the beam between the various points measured, the distance between at least two of said points, and calculate coordinates of at least one said point relative to a previously measured point, and compares the calculated distance between said at least two points with a standard value stored in the computer.

2. Device according to claim 1, wherein said telemeter comprises a laser telemeter emitting a modulated laser beam and wherein the points whose distance from the telemeter is to be measured are equipped with reflecting targets for reflecting the light of the laser beam in its direction of emission.

3. Device according to claim 2, wherein the telemeter is mounted on a support articulated on two perpendicular axes of rotation, the point of intersection of these two axes coinciding with a zero point for measurements of the telemeter.

4. Device according to claim 2, wherein the telemeter is mounted on a fixed support and the laser beam is pointed onto a mirror articulated on two perpendicular axes whose point of intersection coincides with a point of impingement of the laser beam on the mirror.

5. Device according to claim 1, wherein the computer is equipped with means for storing in memory theoretical values of the coordinates of a certain number of points or of the distances between certain points of the vehicle, and means for comparing the measured values with those theoretical values.

6. Device according to claim 1 wherein each said reflecting target includes means to secure it at each point of the vehicle belonging to a series of measurements.

7. Device according to claim 6 wherein the telemeter is designed also to measure the light intensity of the laser beam received, the computer being arranged to act on the laser beam positioning stepping motor, to displace the beam relative to a target, until maximum light intensity is received.

8. Device according to claim 1, wherein an electronic device permits, on demand of the computer, to reflect onto a receiver a portion of the beam from a transmitter along a known path, thus providing for calibration and permitting measurement independent of possible variations in time of such parameters as temperature atmospheric pressure.

9. Device according to claim 1, wherein the device further comprises a carriage on which the telemeter is mounted.

* * * * *

UNITED STATES PATENT AND TRADEMARK OFFICE
CERTIFICATE OF CORRECTION

PATENT NO. : 5,140,533
DATED : August 18, 1992
INVENTOR(S) : Germain Celette

It is certified that error appears in the above—identified patent and that said Letters Patent is hereby corrected as shown below:

Column 8, line 19, "motor" should be --motors--.

Signed and Sealed this

Sixteenth Day of November, 1993

Attest:

BRUCE LEHMAN

Attesting Officer

Commissioner of Patents and Trademarks